US012659212B1

(12) United States Patent
Madanayake et al.

(10) Patent No.: US 12,659,212 B1
(45) Date of Patent: Jun. 16, 2026

(54) SYSTEM AND METHOD FOR MODULATION AND SIGNAL CLASSIFICATION

(71) Applicants: Habarakada Liyanachchi Prabath Arjuna Madanayake, Miami, FL (US); Nimasha Hiruni Silva Pilippange, Miami, FL (US)

(72) Inventors: Habarakada Liyanachchi Prabath Arjuna Madanayake, Miami, FL (US); Nimasha Hiruni Silva Pilippange, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/446,499

(22) Filed: Jan. 12, 2026

(51) Int. Cl.
  *H04L 27/26* (2006.01)
(52) U.S. Cl.
  CPC .............................. *H04L 27/26524* (2021.01)
(58) Field of Classification Search
  CPC ................................................ H04L 27/26524
  See application file for complete search history.

(56) References Cited

U.S. PATENT DOCUMENTS

| | | | |
|---|---|---|---|
| 2013/0045703 A1* | 2/2013 | Kommate .............. | H04B 17/26 455/226.1 |
| 2018/0006730 A1* | 1/2018 | Kuo .................... | H04J 14/0307 |
| 2021/0084601 A1* | 3/2021 | Rofougaran ........ | H04W 56/001 |
| 2022/0254264 A1* | 8/2022 | Xie ...................... | G06V 40/103 |

* cited by examiner

*Primary Examiner* — Janice N Tieu
(74) *Attorney, Agent, or Firm* — SALIWANCHIK, LLOYD & EISENSCHENK

(57) ABSTRACT

Systems and methods are provided for generating low-complexity radio digital signal processing (DSP) and artificial intelligence (AI)-processing via Spectrum Correlation Function (SCF) using an Approximate Discrete Fourier Transform (ADFT) with linear computational complexity O(N) for modulation and signal classification. The system reduces computational complexity and memory usage compared to conventional fast Fourier transform (FFT)-based methods, enabling deployment in low size, weight, and power (SWaP), resource-constrained systems such as edge computing devices and software-defined radios. This improved efficiency supports advanced applications including real-time AI-based recognition and classification of radio waveforms, modulation classification, and AI-driven radio intelligence.

20 Claims, 9 Drawing Sheets

SYSTEM AND METHOD FOR MODULATION AND SIGNAL CLASSIFICATION

GOVERNMENT SUPPORT

This invention was made with government support under 2229471 awarded by the National Science Foundation. The government has certain rights in the invention.

BACKGROUND

Various application areas such as radar, electronic warfare, signals intelligence, and artificial intelligence (AI) and machine learning (ML) based radio frequency systems demand efficient computation of Spectrum Correlation Function (SCF). The SCF, defined as the Fourier transform of cycle covariance and typically computed using the fast Fourier transform (FFT), is extensively employed to extract cyclostationary properties inherent in received signals. The SCF is widely utilized in Department of Defense (DoD) systems where computational efficiency is critical.

Although the FFT enables SCF computation with computational complexity on the order of O(n log n), the FFT may present challenges in resource constrained environments. Such challenges include high memory bandwidth requirements, limited adaptability to sparse or structured inputs, and decreased efficiency when implemented on hardware platforms characterized by low-power consumption or embedded system constraints.

BRIEF SUMMARY

The limitations in the related art motivate the development of more efficient Spectrum Correlation Function (SCF) computation methods that can better support artificial intelligence (AI)-driven processing by reducing computational overhead and improving suitability for deployment in resource-limited and real-time systems. To address the challenges discussed in the Background, embodiments of the subject invention provide novel and advantageous systems and methods for generating low-complexity radio digital signal processing (DSP) and AI-processing via SCF using O(N) Approximate Discrete Fourier Transform (ADFT).

In an embodiment, a system for generating low-complexity radio DSP and AI-processing via SCF using ADFT with linear computational complexity O(N) for modulation and signal classification can comprise: a phased antenna array; a receiver array in operable communication with the phased antenna array; a processor; and a machine-readable medium in operable communication with the processor and having instructions stored thereon that, when executed by the processor, perform the following steps: a) receiving a digital input signal comprising in-phase (I) and quadrature (Q) components from the receiver array; b) normalizing the I and Q components, thereby generating a normalized signal with zero mean and unit power; c) computing SCF by applying a sparse, factorized ADFT to cyclic autocorrelation of the normalized signal, thereby generating a SCF feature matrix; d) inputting the SCF feature matrix for training a neural network model; and e) outputting a modulation classification label corresponding to type of modulation present in the digital input signal. The sparse, factorized ADFT can be based on sparse factorized transformation configured to reduce computational complexity to approximately O(N). The sparse, factorized ADFT can comprise a sequence of sparse matrix operations, including diagonal and permutation matrices. Step b) can comprise the sub-steps of: b1) removing a zero-frequency component by subtracting a mean of each of the I and Q components over a defined window; b2) calculating a signal magnitude for each complex sample formed by the I and Q components at a single point in time; and/or b3) scaling each complex sample to generate the normalized signal with zero mean and unit power. Step c) can comprise the sub-steps of: c1) segmenting the digital input signal into a plurality of time-domain analysis windows, each time-domain analysis window being overlapping or non-overlapping; c2) applying a Hamming window function to each time-domain analysis window to mitigate spectral leakage, thereby generating windowed segments; c3) applying a first ADFT to each windowed segment to obtain frequency-domain segments; c4) performing frequency down-conversion by mixing each frequency-domain segment with a complex local oscillator signal to shift the frequency-domain segments to baseband, thereby generating pairs of baseband-shifted frequency-domain segments; c5) performing conjugate multiplication between the pairs of baseband-shifted frequency-domain segments to extract spectral correlation values, thereby generating conjugate multiplied segments; c6) applying a second ADFT to the spectral correlation values, thereby generating SCF values over a range of cycle frequencies and spectral frequencies through SCF computation; and/or c7) generating a SCF feature matrix by mapping the SCF values across dimensions of the cycle frequencies and the spectral frequencies, thereby characterizing cyclostationary properties of the digital input signal. The first ADFT can be configured to transform each windowed segment from the time domain to the frequency domain. The second ADFT can be configured to operate over correlation delays corresponding to the conjugate multiplied segments, thereby extracting cyclostationary features. The SCF values can be generated by associating accumulated spectral correlation values with corresponding cycle frequencies and spectral frequencies. Step c) can be performed in real time on streaming input data using high-bandwidth hardware designed to reduce power consumption. Step c) can be executed on an edge computing device comprising an embedded processor, a software-defined radio (SDR), and/or a mobile radio terminal.

In another embodiment, a method for generating low-complexity radio DSP and AI-processing via SCF using ADFT with linear computational complexity O(N) for modulation and signal classification can comprise: a) receiving a digital input signal comprising in-phase (I) and quadrature (Q) components from a receiver array operatively coupled to a phased antenna array; b) normalizing the I and Q components, thereby generating a normalized signal with zero mean and unit power; c) computing SCF by applying a sparse, factorized ADFT to cyclic autocorrelation of the normalized signal, thereby generating a SCF feature matrix; d) inputting the SCF feature matrix for training a neural network model; and e) outputting a modulation classification label corresponding to type of modulation present in the digital input signal. The sparse, factorized ADFT can be based on sparse factorized transformation configured to reduce computational complexity to approximately O(N). The sparse, factorized ADFT can comprise a sequence of sparse matrix operations, including diagonal and permutation matrices. Step b) can comprise the sub-steps of: b1) removing a zero-frequency component by subtracting a mean of each of the I and Q components over a defined window; b2) calculating a signal magnitude for each complex sample formed by the I and Q components at a single point in time; and/or b3) scaling each complex sample to generate the normalized signal with zero mean and unit power. Step c) can comprise the sub-steps of: c1) segmenting the digital input signal into a plurality of time-domain analysis windows, each time-domain analysis window being overlapping or non-overlapping; c2) applying a Hamming window function to each time-domain analysis window to mitigate spectral leakage, thereby generating windowed segments; c3) applying a first ADFT to each windowed segment to obtain frequency-domain segments; c4) performing frequency down-conversion by mixing each frequency-domain segment with a complex local oscillator signal to shift the frequency-domain segments to baseband, thereby generating pairs of baseband-shifted frequency-domain segments; c5) performing conjugate multiplication between the pairs of baseband-shifted frequency-domain segments to extract spectral correlation values, thereby generating conjugate multiplied segments; c6) applying a second ADFT to the spectral correlation values, thereby generating SCF values over a range of cycle frequencies and spectral frequencies through SCF computation; and/or c7) generating a SCF feature matrix by mapping the SCF values across dimensions of the cycle frequencies and the spectral frequencies, thereby characterizing cyclostationary properties of the digital input signal. The first ADFT can be configured to transform each windowed segment from the time domain to the frequency domain. The second ADFT can be configured to operate over correlation delays corresponding to the conjugate multiplied segments, thereby extracting cyclostationary features. The SCF values can be generated by associating accumulated spectral correlation values with corresponding cycle frequencies and spectral frequencies. Step c) can be performed in real time on streaming input data using high-bandwidth hardware designed to reduce power consumption. Step c) can be executed on an edge computing device comprising an embedded processor, an SDR, and/or a mobile radio terminal. Any or all steps or sub-steps can be performed by a processor.

BRIEF DESCRIPTION OF DRAWINGS

FIG. 2a shows ideal 32-point and 128-point FFT. FIG. 2b shows low-complexity 32-point and 128-point Approximate Discrete Fourier Transform (ADFT). The ADFT provides a close approximation to the SCF obtained using the FFT. For a small number of FFT points (e.g., N less than or equal to 32), the ADFT factorization is O(1) (i.e., multiplierless). For larger N (e.g., greater than 32) the arithmetic (multiplier) complexity scales as O(N).

FIG. 3a shows ideal 32-point and 128-point FFT. FIG. 3b shows low-complexity 32-point and 128-point ADFT. An ADFT yields an accurate approximation of the SCF as computed by the FFT.

FIG. 4a shows 128-point FFT. FIG. 4b shows low-complexity 128-point ADFT. The ADFT closely approximates the SCF computed via FFT.

instead of the typical FFT approach, according to an embodiment of the subject invention.

Figure 6A:
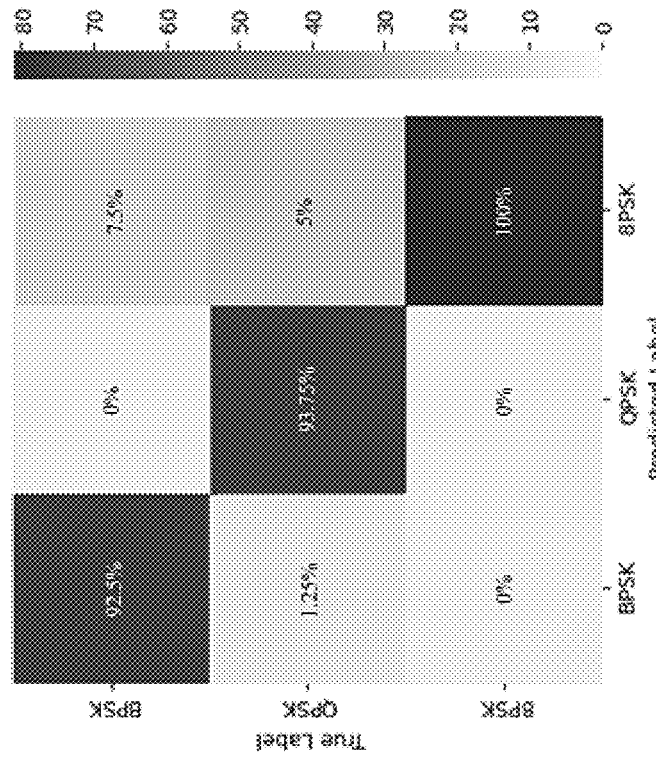
Figure 6B:
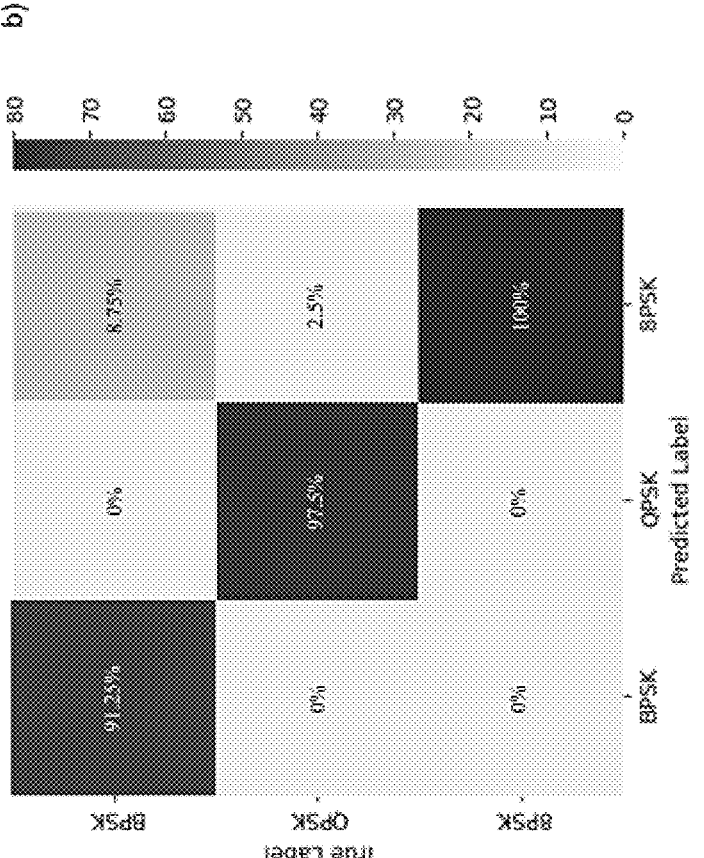

FIGS. 6a-6b show simulation model results depicting confusion matrices for a convolutional neural network (CNN) trained and tested using N-point data. FIG. 6a shows confusion matrix derived from SCF images computed via FFT with computational complexity O(N log N). FIG. 6b shows confusion matrix derived from ASCF images computed via ADFT with computational complexity O(N). Both simulations employed 80 modulated signals with 10 dB signal-to-noise ratio (SNR), demonstrating classification accuracies exceeding 91% within the simulation parameters.

Figure 7A:
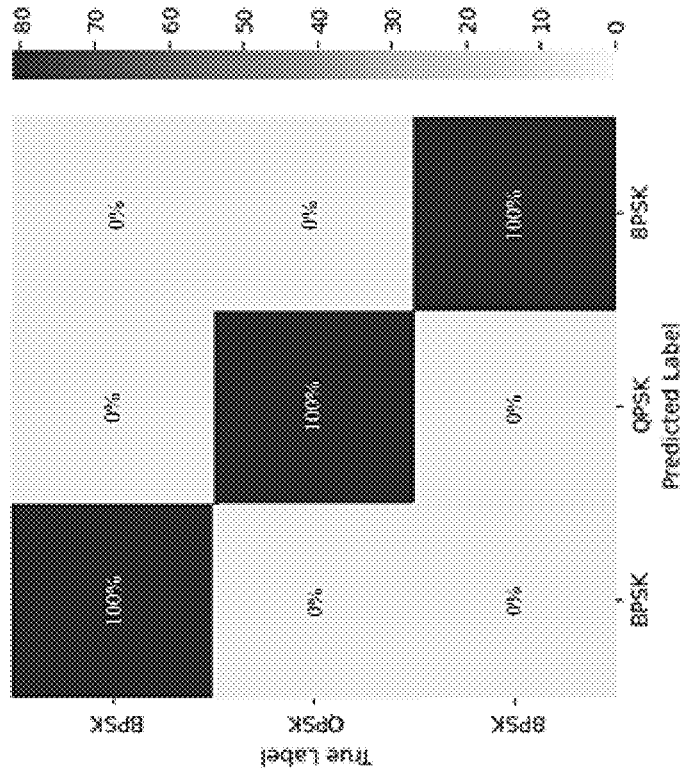
Figure 7B:
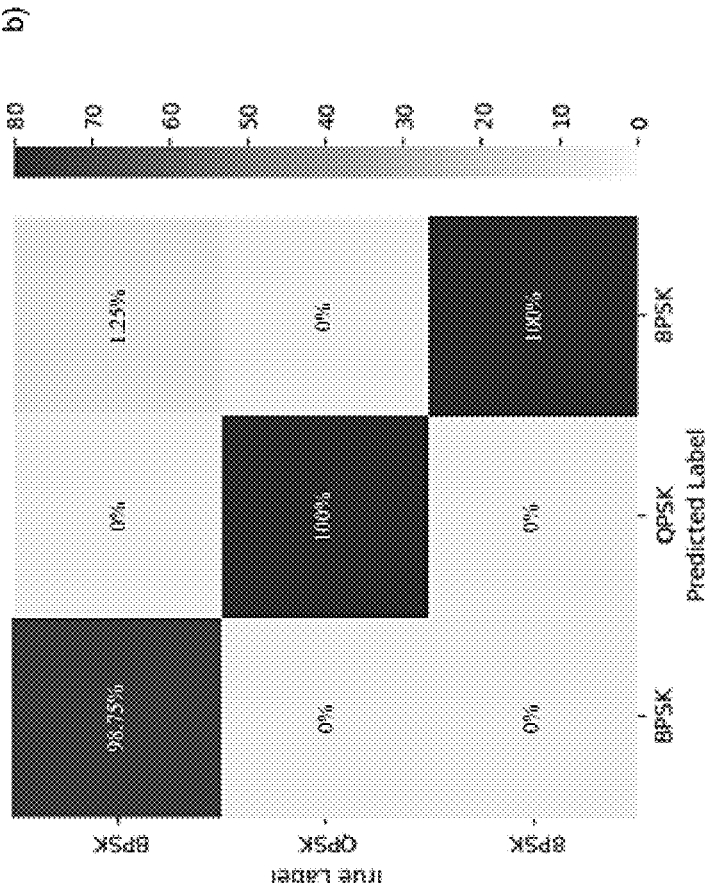

FIGS. 7a-7b show simulation model results depicting confusion matrices for a CNN trained and tested using n-point data. FIG. 7a shows confusion matrix derived from SCF images computed via FFT with computational complexity O(N log N). FIG. 7b shows confusion matrix derived from ASCF images computed via ADFT with computational complexity O(N). Both simulations employed 80 modulated signals with 30 dB SNR, demonstrating classification accuracies exceeding 98% within the simulation parameters.

Figure 8:
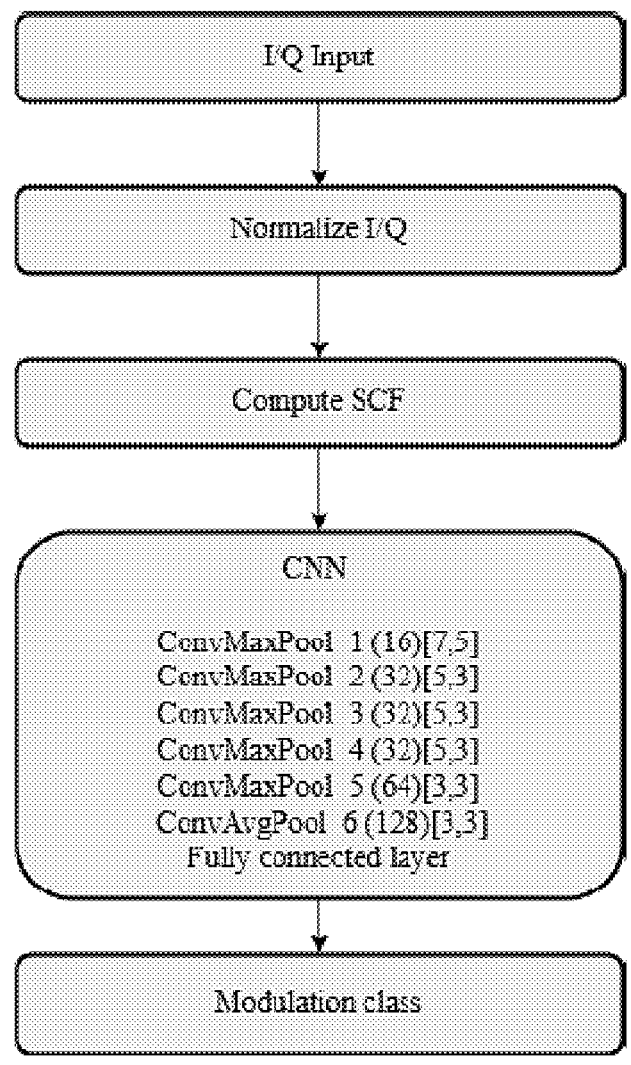

FIG. 8 shows a schematic diagram of a CNN architecture receiving SCF feature representations as input, according to an embodiment of the subject invention, with custom neural network (NN) layers identified along with the respective filters and filter sizes.

Figures 9A, 9B:
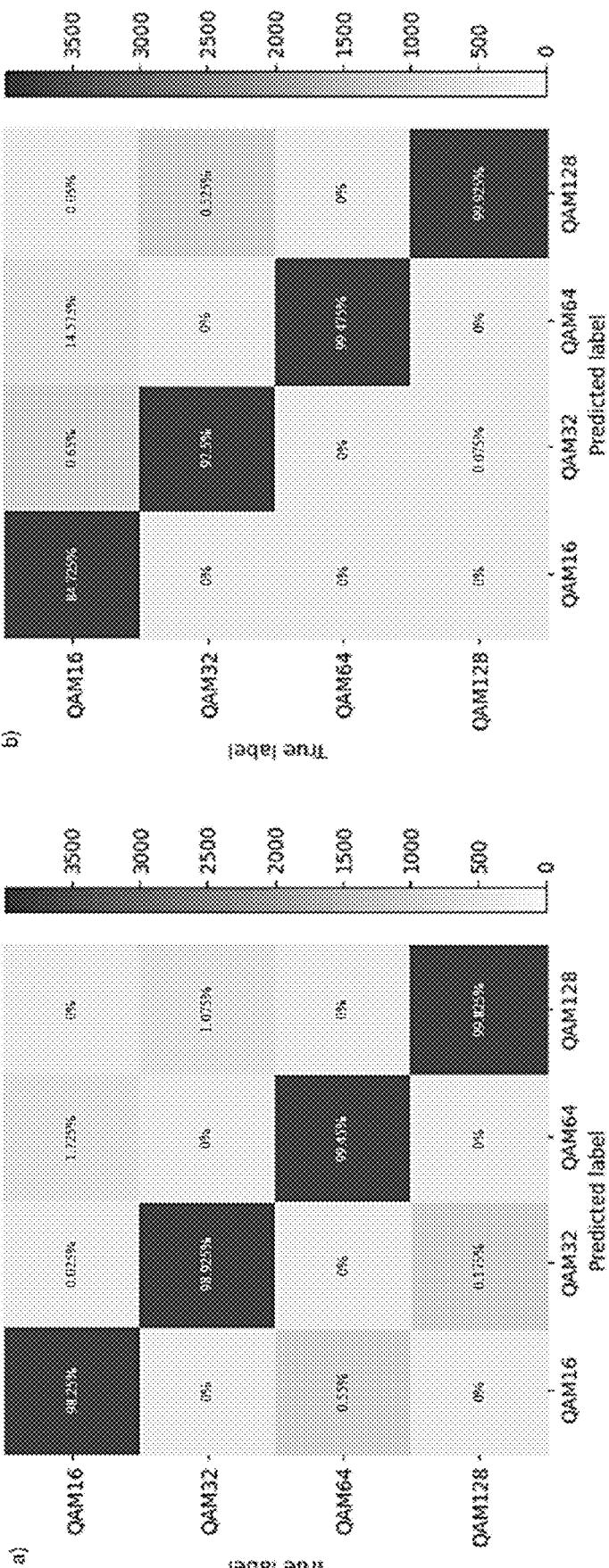

FIGS. 9a-9b show over-the-air testing results showing confusion matrices for a CNN trained and tested with N-point data. FIG. 9a shows results from SCF-based NN using FFT with computational complexity O(N log N). FIG. 9b shows results from ASCF images using ADFT with computational complexity O(N). Both cases employed over-the-air signal data, demonstrating classification performance under real-world wireless conditions.

DETAILED DESCRIPTION

Embodiments of the subject invention provide novel and advantageous systems and methods for generating low-complexity radio digital signal processing (DSP) and artificial intelligence (AI)-processing via Spectrum Correlation Function (SCF) using O(N) Approximate Discrete Fourier Transform (ADFT).

Application domains such as radar, electronic warfare, signals intelligence, and AI and machine learning (ML) based radio frequency (RF) systems, including modulation recognition, signature recognition, and related algorithms, require efficient computation of the SCF. The SCF, defined as the Fourier transform of cycle covariance, is extensively utilized to extract cyclostationary properties from received signals. The SCF finds broad application in wireless communication, signals intelligence (SIGINT), and electronic warfare (EW), where computational efficiency is paramount. While fast Fourier transform (FFT) facilitates efficient SCF computation with a complexity on the order of O(N log N), the FFT may impose limitations in resource-constrained environments due to its demand for high memory bandwidth, limited adaptability to sparse or structured inputs, and reduced efficiency when implemented on certain hardware platforms such as low-power or embedded systems.

Embodiments of the subject invention provide algorithms, methods, architectures, and prototypes configured to reduce SCF computation complexity to O(N) by employing a sparse factorized ADFT in place of the traditional FFT. By integrating SCF computational cores at the software and/or hardware level, the low-complexity alternative to FFTs is exploited to reduce chip area, computational time, and power consumption associated with Approximate Spectrum Correlation Function (ASCF) computations to O(N). Such an N-fold reduction in arithmetic complexity offers significant advantages for edge computing applications in wireless, RF, and other Department of Defense (DoD)-centric systems.

For example, for a typical SCF implementation using a 1024-point FFT with an output size on the order of 1024× 1024, replacing the FFT with the ADFT achieves approximately a tenfold reduction in computational complexity. Correspondingly, reductions of up to ten times in chip area, power consumption, and computation time are expected for various DoD systems utilizing the ADFT.

Embodiments of the subject invention provide at least the following advantageous features: (1) reduction in time complexity; (2) reduction in chip area and power consumption; and (3) real-time, high-bandwidth hardware implementation. With respect to the reduction in time complexity, the use of the ADFT within a sparse factorized algorithm implemented in software achieves a log n fold reduction in the time complexity of the SCF computation. The reduction results in a corresponding log n fold decrease in execution time on conventional serial architectures, such as typical Von Neumann systems. With respect to the reduction in chip area and power consumption, Field-Programmable Gate Array (FPGA) and custom Integrated Circuit (IC) implementations, including Application-Specific Integrated Circuit (ASIC) type digital Complementary Metal-Oxide-Semiconductor (CMOS) technologies, can achieve up to a log n factor reduction in multiplier hardware complexity within a fully parallel systolic array architecture. The reduction corresponds to a log N fold decrease in total chip area and power consumption of the SCF core on-chip. With respect to the real-time, high-bandwidth hardware implementation, real-time, high-bandwidth hardware realization of the SCF is essential for applications in EW, defensive sensing, fire control radar, AI- and ML-based radar signature detection, waveform detection, signature recognition, and SIGINT systems. Custom on-chip implementations can derive substantial benefits from reductions in chip area, resulting in lower production costs, and from decreased power consumption, owing to a logarithmic reduction in multiplication operations. The reduction in power consumption is particularly critical for low-power and loitering systems, where extended battery life is vital to mission success.

Figure 1:
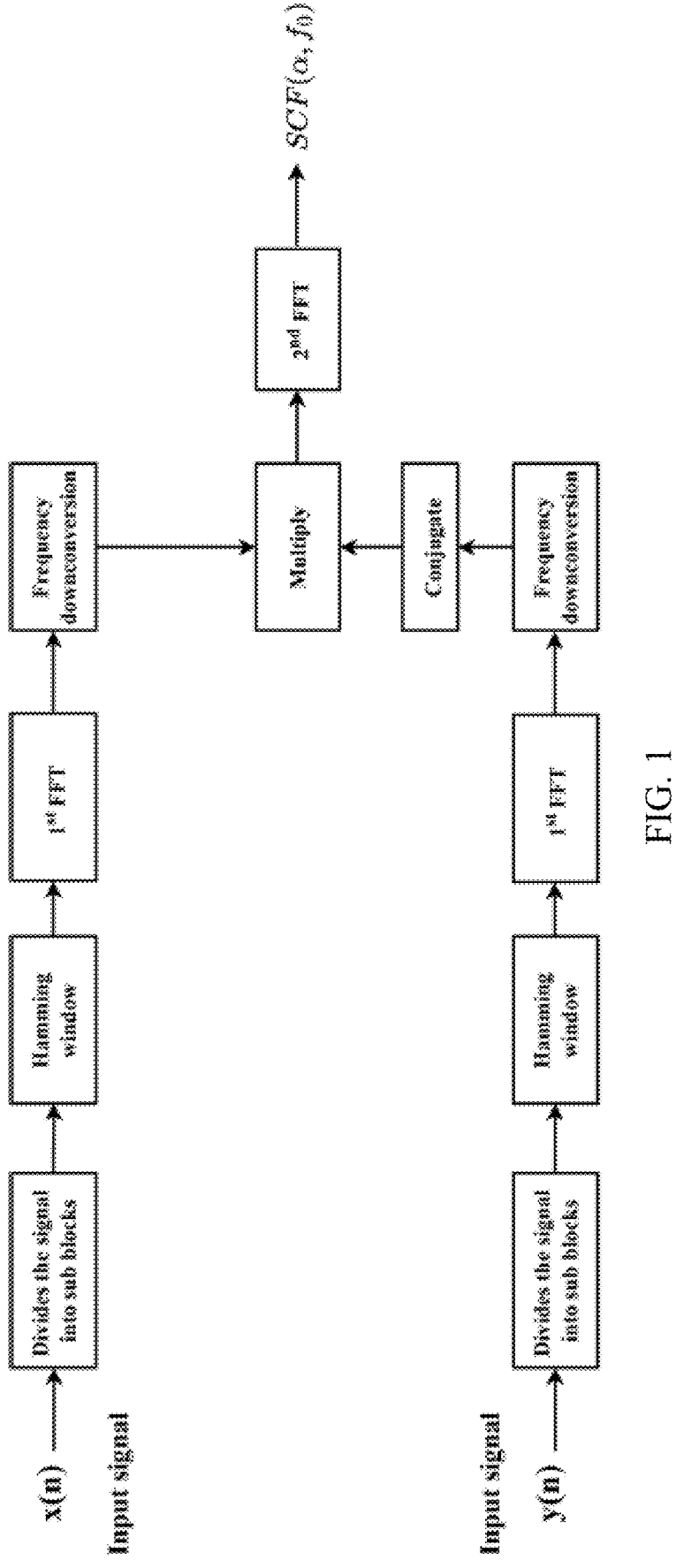
FIG. 1 shows a schematic view of an implementation of a fast Fourier transform (FFT)-based accumulation method (FAM) based Spectrum Correlation Function (SCF).

FIG. 1 shows FFT-based accumulation method (FAM) to compute estimates of the SCF. The FAM belongs to the class of time-smoothing algorithms and efficiently computes the complete set of cyclic frequencies. Initially, the input data is channelized using an n-prime-point FFT with hops over segments of length L samples. Subsequently, complex demodulation is performed after down-conversion to baseband. Following conjugate multiplication, a P-point FFT is applied to obtain the SCF. Finally, the Fourier transform outputs are mapped to the corresponding spectral and cyclic frequencies within the normalized ranges of −0.5 to 0.5 and −1.0 to 1.0, respectively. The point estimate associated with cycle frequency ai and spectral frequency $f_j$ is determined according to equations (1) and (2). The principal domain of the SCF assumes a diamond shape in the f-a plane. It is noted that increasing n improves the accuracy of the estimate.

$$\alpha_i = f_k - f_l \quad (1)$$

$$f_j = (f_k + f_l)/2 \quad (2)$$

The output of the FAM is therefore given by $$S_{xy_r}^{\alpha_i + q\Delta\alpha}(nL, f_j)_{\Delta t} = \sum_r X_T(rL, f_k)Y^*(rL, f_l)g_c(n-r)e^{-j2\pi rq/P} \quad (3)$$

Upon applying the ADFT to input data, the resulting complex-valued ADFT bin outputs are represented using logarithmic number encoding. Specifically, a complex value $X_r + jX_i$ is represented as $\phi^{xr} + j\phi^{xi}$ where $(x_r, x_i) \in R^2$ are logarithmic exponents approximated using two's complement fixed-point representation with M-bit precision. The logarithmic components $x_r = \log_\phi X_r$ and $x_i = \log_\phi X_i$ are precomputed and stored in look-up tables (LUTs) for efficient access. The logarithmic base $\phi$ is typically a complex constant, with common values including $\phi \in \{2, 3, 5, 7, e, \pi\}$, where $\phi = e$ (the natural logarithm) is assumed as the default unless otherwise specified.

The computation of the products XY where $X \in C$ and $Y \in C$ takes the form $(X_r + jX_i)(Y_r + jY_i) = (\phi^{xr} + j\phi^{xi})(\phi^{yr} + j\phi^{yi})$ which reduces to $\phi^{xr+yr} - \phi^{xi+yi} + j[\phi^{xr+yi} + \phi^{xi+yr}]$. This shows that the complex products required for the FAM algorithm can be computed using only two's complement adders and LUT encoder and decoder pairs. These components typically scale in complexity as $O(M)$, in contrast to $O(M^2)$ for conventional M-bit multipliers. Consequently, the FAM algorithm can be implemented with significantly reduced computational complexity by leveraging the logarithmic number representations described above. As a result, the ASCF algorithm can be realized without the need for complex multiplications within the FAM computation stage. In such an implementation, the primary contributor to multiplier complexity within the ADFT computation is the set of diagonal values introduced by the ADFT factorization, which enables efficient transform implementation with structured multiplicative operations.

AI-enabled real-time sensing and RF perception are critical capabilities for emerging intelligent wireless communication and EW systems. Harmful radio frequency interference (RFI) presents a significant threat to both real-time sensing and SIGINT operations. The Howells-Applebaum algorithm is particularly effective in scenarios where the primary beam direction of the receiver array is user-defined, with adaptive nulls placed in real time to suppress interfering sources. However, when the number of RFI sources becomes large, the $O(N^3)$ arithmetic complexity associated with matrix inversion introduces a computational bottleneck, hindering the rapid adaptation of the Howells-Applebaum null-forming process. Null-forming is the process of adjusting an antenna array's response to create directional nulls that suppress interference or jamming signals from specific directions while preserving the desired signal.

To address the limitation, a multi-level adaptive beamforming architecture has been proposed and demonstrated, which significantly reduces the computational complexity of matrix inversion in environments with numerous RFI sources. The Howells-Applebaum algorithm is implemented as a preprocessing stage for subsequent modulation recognition tasks. In experimental evaluations involving real-world, over-the-air RF signals subject to substantial RFI and jamming conditions, the system demonstrates effective RFI suppression via adaptive null-forming. Furthermore, both the ADFT and the FFT are employed in SCF computation to evaluate their respective impacts on AI- and ML-based modulation and signature recognition performance. The results indicate that the proposed system maintains robust performance under severe RFI conditions, validating the utility of ADFT-based SCF methods for AI-driven RF applications.

Figure 5:
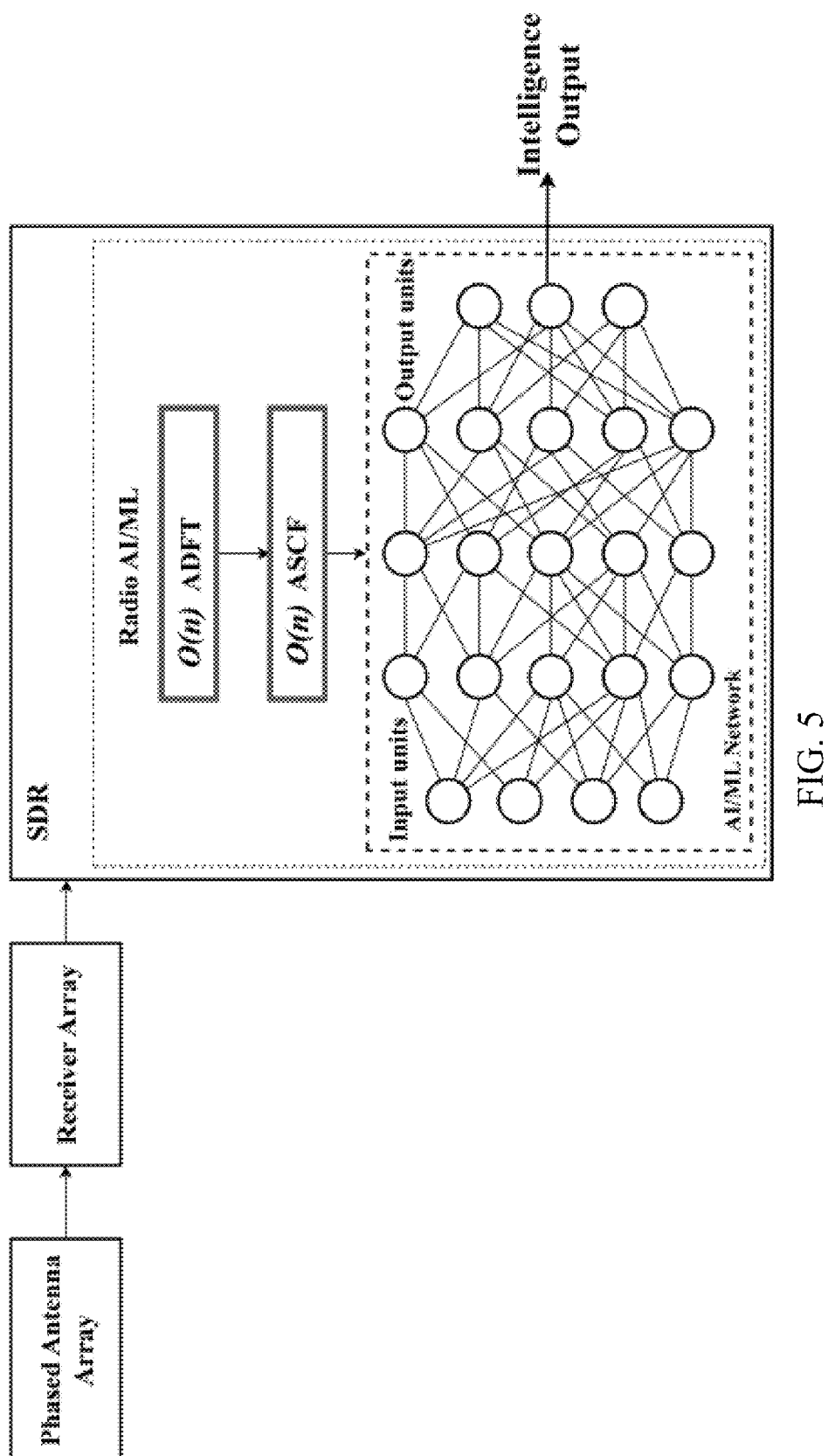
FIG. 5 shows a schematic view of a low-complexity ADFT based SCF architecture for modulation and radio signature recognition. An Approximate Spectrum Correlation Function (ASCF) is computed using the low-complexity sparse factorized ADFT (worst case complexity O(N))

A general adversarial AI-based spectrum perception architecture, as shown in FIG. 5, has been implemented to support concurrent execution of adversarial signal jamming, real-time RFI suppression through adaptive null-forming. AI-driven radio intelligence operations are performed within the 5.7-5.8 GHz frequency band. The impact of adaptive null-forming-based jammer and RFI suppression on AI-enabled spectrum perception was assessed through experiments employing a convolutional neural network (CNN) for automatic modulation recognition (AMR). The evaluation involved real-time reception of four quadrature amplitude modulation (QAM) signals under intense RFI conditions, including unregulated real-world interference sources. The architecture receives a digital input signal comprising in-phase (I) and quadrature (Q) components from a receiver array operatively coupled to a phased antenna array. The method normalizes the I and Q components to generate a normalized signal with zero mean and unit power. In the normalization step, the zero-frequency component is removed by subtracting the mean of each component over a defined window. The signal magnitude is calculated for each complex sample formed by the I and Q components at a single point in time. Each complex sample is scaled to generate a normalized signal with zero mean and unit power. The method computes a SCF by applying a sparse, factorized ADFT to the cyclic autocorrelation of the normalized signal. The resulting SCF representations are input into a deep learning-based neural network (NN) model for modulation classification.

The digital input signal is segmented into a plurality of time-domain analysis windows, each time-domain analysis window being overlapping or non-overlapping. A Hamming window function is applied to each time-domain analysis window to mitigate spectral leakage, thereby generating windowed segments. A first ADFT is applied to each windowed segment to obtain frequency-domain segments. The first ADFT is configured to transform each windowed segment from the time domain to the frequency domain. Frequency down-conversion is performed by mixing each frequency-domain segment with a complex local oscillator signal to shift the frequency-domain segments to baseband, thereby generating pairs of baseband-shifted frequency-domain segments. Conjugate multiplication is performed between the pairs of baseband-shifted frequency-domain segments to extract spectral correlation values, thereby generating conjugate multiplied segments. A second ADFT is applied to the spectral correlation values, thereby generating SCF values over a range of cycle frequencies and spectral frequencies. The second ADFT is configured to operate over correlation delays corresponding to the conjugate multiplied segments and extract cyclostationary features. An SCF feature matrix is generated by mapping the SCF values across the dimensions of the cycle frequencies and spectral frequencies, thereby characterizing the cyclostationary properties of the digital input signal. The SCF values are generated by associating accumulated spectral correlation values with corresponding cycle frequencies and spectral frequencies. Each ADFT comprises a sequence of sparse matrix operations that include diagonal and permutation matrices. The SCF computation is executed on an edge computing device that comprises an embedded processor, a software-defined radio (SDR), and a mobile radio terminal.

A performance baseline for SCF-based modulation recognition is established using the FAM. Subsequently, the ML models retrain using the ADFT in place of the FFT to realize the ASCF within the FAM framework, thereby improving classification accuracy. When substituting the FFT with the ADFT, retraining of the NNs is necessary, even when using the same measured waveforms acquired through the phased-array beamformer, due to differences in spectral representation introduced by the approximation. The overall architecture of the NN, including custom feature-extraction layers, is illustrated in FIG. 8. The model includes CNN branches specifically designed for the classification of digitally modulated waveforms. The total number of trainable parameters in the model is 140,548.

Embodiments of the subject invention provide a focused technical solution to the focused technical problem of how to generate low-complexity radio DSP and AI-processing via SCF using ADFT with linear computational complexity O(N) for modulation and signal classification. The solution is provided by a sparse, factorized ADFT to facilitate efficient computation of the ASCF by operating on the cyclic autocorrelation of the input signal. This approach significantly reduces computational complexity and memory requirements relative to conventional FFT-based techniques, thereby enabling real-time processing of streaming data in bandwidth- and power-constrained environments. The technical solution provided by embodiments of the subject invention is specific to computer technology, addresses a technical problem within the field of computer technology, and results in improved computer systems by reducing resource consumption, thereby facilitating deployment on edge computing devices and software-defined radios, and enhancing system responsiveness, scalability, and energy efficiency. Embodiments of the subject invention have the focused, technologically-specific practical application of enabling efficient real-time computation of SCFs with linear complexity O(N) within resource-constrained computer systems characterized by low size, weight, and power (SWaP), thereby improving signal processing capabilities at the network edge and in reconfigurable radio platforms. Embodiments can include using the results of the model (e.g., the modulation classification label) to control a device (e.g., an edge computing device, a software-defined radio, and/or a mobile radio terminal).

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (including any value or subrange contained therein) are intended to be explicitly included. When the term "about" or "approximately" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Materials and Methods

The antenna array is implemented using a custom-designed 32-element subarray configuration. A 32-channel phased-array receiver can include receiver electronics and digital backend. Each subarray can include a vertically oriented 4×1 series-fed patch antenna arrangement, enabling passive broadside beamforming in the elevation plane.

Each receiver front end is equipped with a low-noise amplifier (LNA) offering 16 dB gain across the 5.7-5.8 GHz range and a noise figure of 2.4 dB. The amplified signals are filtered using a bandpass filter with a 4.7-6 GHz passband to mitigate out-of-band noise and interference. Following bandpass filtering, the signals are down-converted via mixers and further processed through low-pass filters to generate low intermediate frequency (IF) outputs. A centralized, low-phase-noise local oscillator (LO), specifically the VALON-RF 5015, distributes synchronized LO signals to each receiver using passive microwave 4- and 8-way power dividers.

Each of the 32 receivers operates in parallel and is mapped to an individual 5.7-5.8 GHz subarray. Signal digitization is carried out using the Reconfigurable Open Architecture Computing Hardware version 2 (ROACH-2) platform, which is an FPGA-based multichannel signal processor developed by the Square Kilometer Array (SKA) community and supported by an open-source software stack. Digitized data is processed using an AMD Xilinx Virtex-6 SX475T FPGA, providing the necessary resources for real-time, high-throughput digital signal processing.

Example 1

Figures 2A, 2B:
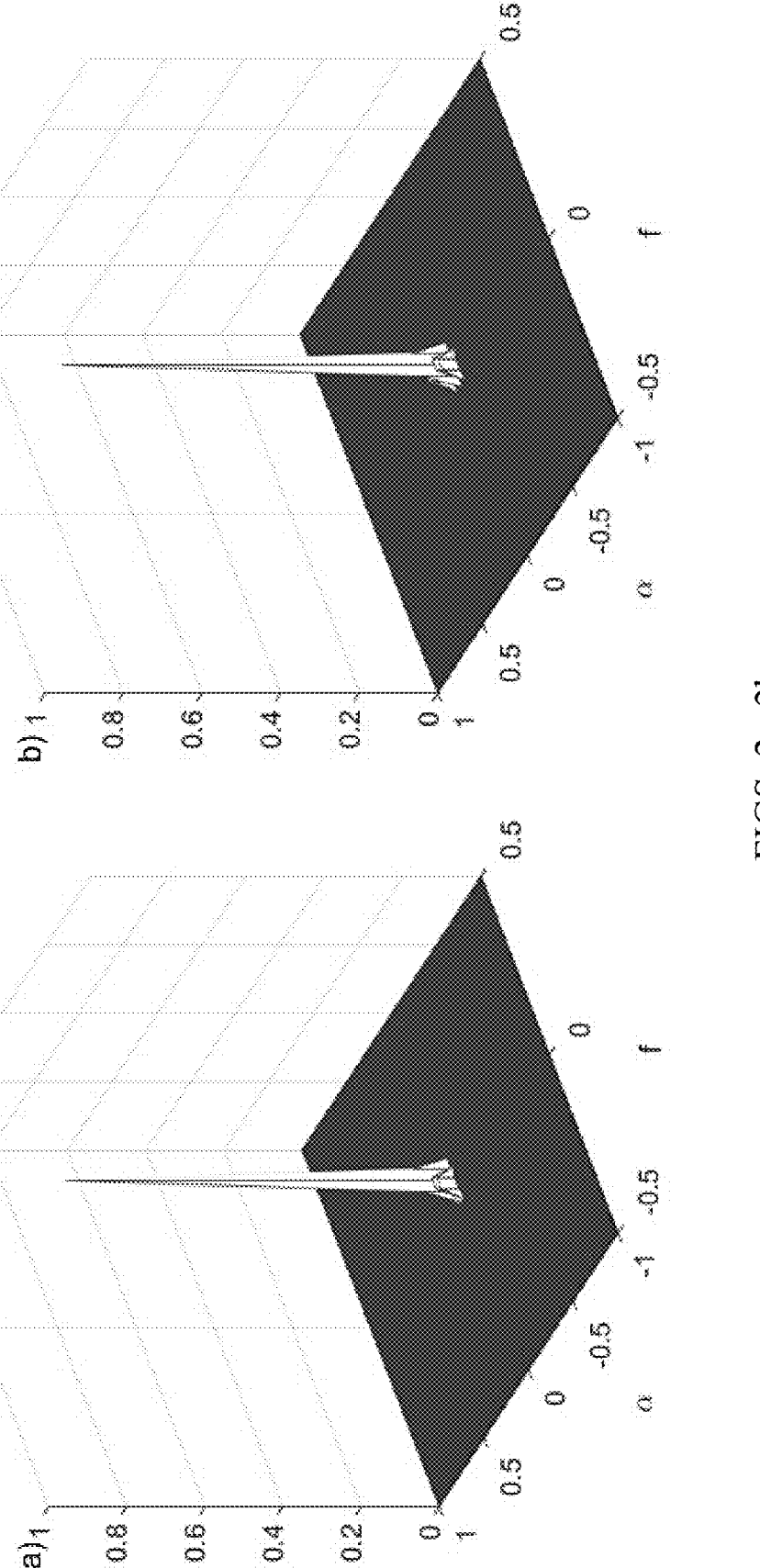
FIGS. 2a-2b show SCF computed for a sinusoidal tone.
Figure 3A:
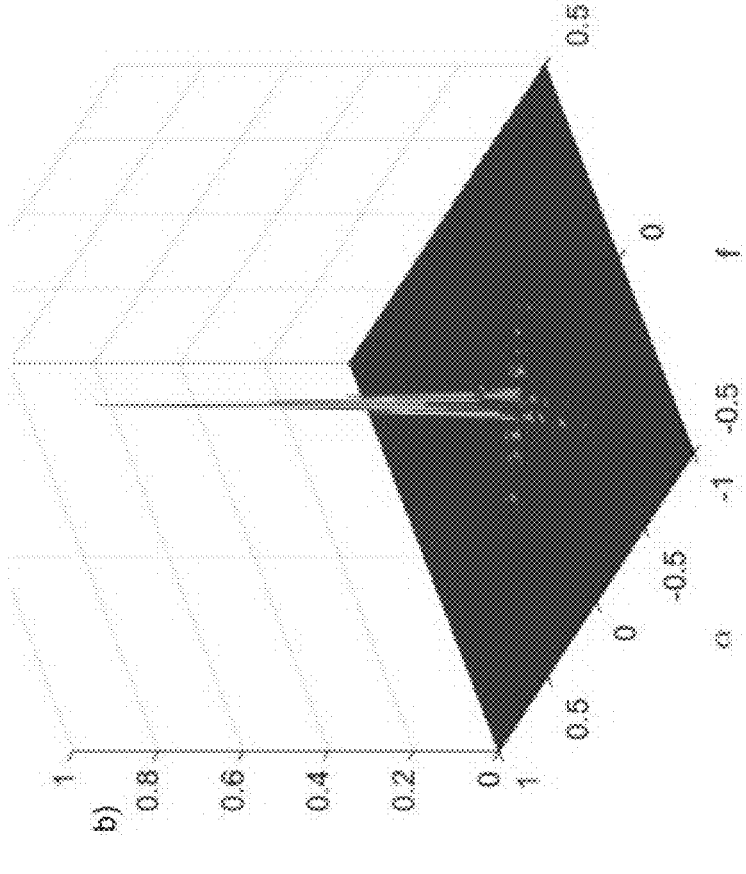
FIGS. 3a-3b show SCF for a Binary Phase-Shift Keying (BPSK) modulated signal.
Figure 3B:
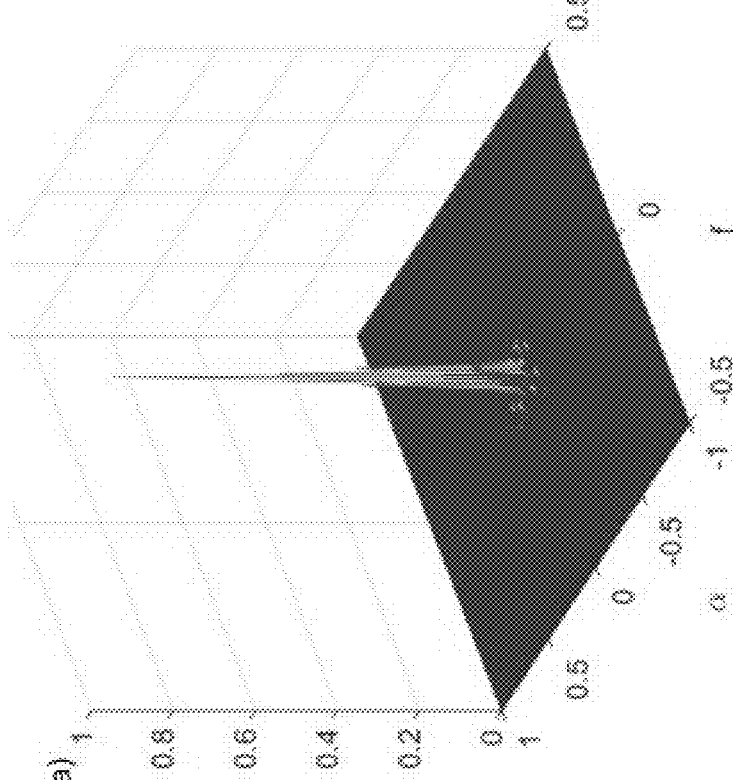
Figures 4A, 4B:
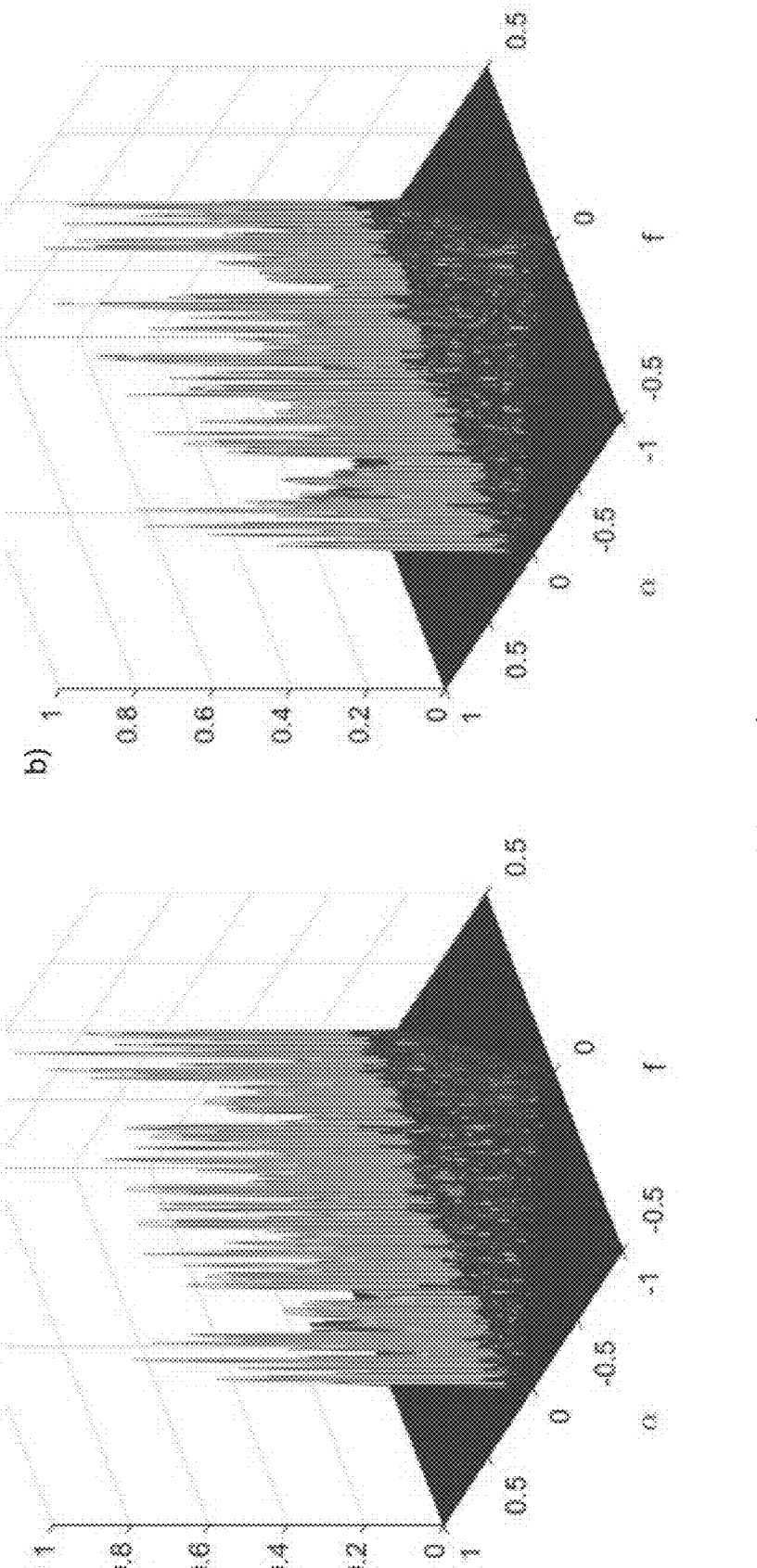
FIGS. 4a-4b show SCF for a Quadrature Phase-Shift Keying (QPSK) modulated signal.

An evaluation is conducted on the algorithmic performance of the SCF computation using the FAM based on the sparse factorization of the ADFT. The sparse factorization of the ADFT exhibits linear complexity in terms of the number of multipliers and provides a close approximation to the actual DFT. ML network is trained using SCF-based pre-processing to support accurate modulation recognition over various wireless waveform types, including Binary Phase-Shift Keying (BPSK), Quadrature Phase-Shift Keying (QPSK), and 8-Phase-Shift Keying (8PSK). The SCF functions as a feature extraction mechanism configured to capture the cyclostationary characteristics inherent to the modulation schemes, thereby improving classification accuracy. FIGS. 2a and 2b respectively show the SCF computed for a sinusoidal tone. FIGS. 3a and 3b respectively show the SCF for a BPSK-modulated signal. FIGS. 4a and 4b respectively present the SCF for a QPSK-modulated signal. Each figure demonstrates that the ADFT provides an accurate approximation of the SCF as computed by the FFT. In each set of figures, subfigure (a) corresponds to the SCF obtained using the FFT-based approach, while subfigure (b) corresponds to the SCF obtained using the ADFT-based approach. The confusion matrices for conventional SCF-based modulation recognition employing the O(N log N) FFT algorithm within the FAM, and for the sparse ADFT replaces the FFT, resulting in an O(N) low-complexity approximation of the SCF integrated with AI and ML networks, are presented herein. Both training and inference utilize FFT-SCF and ADFT-SCF in the experiments. Additionally, a scenario is demonstrated in which training employs FFT, while inference is performed using the ADFT, thereby demonstrating the utility of embodiments of the subject invention in scenarios involving the deployment of pretrained ML models. The modulation recognition results indicate that at a low signal-to-noise ratio (SNR) of 10 dB, the ADFT approach achieves a success rate exceeding 91%, as shown in FIGS. 6a-6b, comparable to the FFT-based method. At a high SNR of 30 dB, both FFT and ADFT approaches exhibit excellent performance, exceeding 98% accuracy, as shown in FIGS. 7a-7b. These results support the conclusion that the ADFT offers significant utility for SCF-based AI and ML applications across strategic signal analysis, electronic conflict systems, and comparable sectors.

The training dataset consisted of 10,000 frames, each containing examples from various modulation schemes sourced from the RadioML2018.a dataset. Each frame included 1,024 in-phase and quadrature (IQ) samples. Training was conducted over-the-air in a real-world environment with uncontrolled RFI, including emissions from Wi-Fi and other ambient sources.

Testing of the CNN model was performed under similar conditions using a separate measurement set acquired immediately after the training data collection. The classification accuracy for QAM signals reached 99% when using the SCF-based model and 94% when using the ASCF-based model, as shown in FIGS. 9(a) and 9(b). The corresponding confusion matrix for the SCF-based testing is presented below. Initially, the CNN was trained and tested using the SCF computed with the FFT, which has a computational complexity of O(N log N). Subsequently, the same NN architecture was trained and tested using SCF approximations derived from the sparse ADFT, offering a lower complexity implementation of O(N).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for generating low-complexity radio digital signal processing (DSP) and artificial intelligence (AI)-processing via Spectrum Correlation Function (SCF) using Approximate Discrete Fourier Transform (ADFT) with linear computational complexity O(N) for modulation and signal classification, the system comprising:

a phased antenna array;

a receiver array in operable communication with the phased antenna array;

a processor; and a machine-readable medium in operable communication with the processor and having instructions stored thereon that, when executed by the processor, perform the following steps:

a) receiving a digital input signal comprising in-phase (I) and quadrature (Q) components from the receiver array;

b) normalizing the I and Q components, thereby generating a normalized signal with zero mean and unit power;

c) computing SCF by applying a sparse, factorized ADFT to cyclic autocorrelation of the normalized signal, thereby generating a SCF feature matrix;

d) inputting the SCF feature matrix for training a neural network model; and e) outputting a modulation classification label corresponding to type of modulation present in the digital input signal.

2. The system according to claim 1, the sparse, factorized ADFT being based on a sparse factorized transformation configured to reduce computational complexity to approximately O(N).

3. The system according to claim 1, the sparse, factorized ADFT comprising a sequence of sparse matrix operations, including diagonal and permutation matrices.

4. The system according to claim 1, step b) comprising the sub-steps of:

b1) removing a zero-frequency component by subtracting a mean of each of the I and Q components over a defined window;

b2) calculating a signal magnitude for each complex sample formed by the I and Q components at a single point in time; and b3) scaling each complex sample to generate the normalized signal with zero mean and unit power.

5. The system according to claim 1, step c) comprising the sub-steps of:

c1) segmenting the digital input signal into a plurality of time-domain analysis windows, each time-domain analysis window being overlapping or non-overlapping;

c2) applying a Hamming window function to each time-domain analysis window to mitigate spectral leakage, thereby generating windowed segments;

c3) applying a first ADFT to each windowed segment to obtain frequency-domain segments;

c4) performing frequency down-conversion by mixing each frequency-domain segment with a complex local oscillator signal to shift the frequency-domain segments to baseband, thereby generating pairs of baseband-shifted frequency-domain segments;

c5) performing conjugate multiplication between the pairs of baseband-shifted frequency-domain segments to extract spectral correlation values, thereby generating conjugate multiplied segments;

c6) applying a second ADFT to the spectral correlation values, thereby generating SCF values over a range of cycle frequencies and spectral frequencies through SCF computation; and c7) generating a SCF feature matrix by mapping the SCF values across dimensions of the cycle frequencies and the spectral frequencies, thereby characterizing cyclostationary properties of the digital input signal.

6. The system according to claim 5, the first ADFT being configured to transform each windowed segment from the time domain to the frequency domain.

7. The system according to claim 5, the second ADFT being configured to operate over correlation delays corresponding to the conjugate multiplied segments, thereby extracting cyclostationary features.

8. The system according to claim 5, the SCF values being generated by associating accumulated spectral correlation values with corresponding cycle frequencies and spectral frequencies.

9. The system according to claim 1, step c) being performed in real time on streaming input data using high-bandwidth hardware designed to reduce power consumption.

10. The system according to claim 1, step c) being executed on an edge computing device comprising an embedded processor, a software-defined radio (SDR), and a mobile radio terminal.

11. A method for generating low-complexity radio digital signal processing (DSP) and artificial intelligence (AI)-processing via Spectrum Correlation Function (SCF) using Approximate Discrete Fourier Transform (ADFT) with linear computational complexity O(N) for modulation and signal classification, the method comprising:

a) receiving a digital input signal comprising in-phase (I) and quadrature (Q) components from a receiver array operatively coupled to a phased antenna array;

b) normalizing the I and Q components, thereby generating a normalized signal with zero mean and unit power;

c) computing SCF by applying a sparse, factorized ADFT to cyclic autocorrelation of the normalized signal, thereby generating a SCF feature matrix;

d) inputting the SCF feature matrix for training a neural network model; and e) outputting a modulation classification label corresponding to type of modulation present in the digital input signal.

12. The method according to claim 11, the sparse, factorized ADFT being based on sparse factorized transformation configured to reduce computational complexity to approximately O(N).

13. The method according to claim 11, the sparse, factorized ADFT comprising a sequence of sparse matrix operations, including diagonal and permutation matrices.

14. The method according to claim 11, step b) comprising the sub-steps of:

b1) removing a zero-frequency component by subtracting a mean of each of the I and Q components over a defined window;

b2) calculating a signal magnitude for each complex sample formed by the I and Q components at a single point in time; and b3) scaling each complex sample to generate the normalized signal with zero mean and unit power.

15. The method according to claim 11, step c) comprising the sub-steps of:

c1) segmenting the digital input signal into a plurality of time-domain analysis windows, each time-domain analysis window being overlapping or non-overlapping;

c2) applying a Hamming window function to each time-domain analysis window to mitigate spectral leakage, thereby generating windowed segments;

c3) applying a first ADFT to each windowed segment to obtain frequency-domain segments;

c4) performing frequency down-conversion by mixing each frequency-domain segment with a complex local oscillator signal to shift the frequency-domain segments to baseband, thereby generating pairs of baseband-shifted frequency-domain segments;

c5) performing conjugate multiplication between the pairs of baseband-shifted frequency-domain segments to extract spectral correlation values, thereby generating conjugate multiplied segments;

c6) applying a second ADFT to the spectral correlation values, thereby generating SCF values over a range of cycle frequencies and spectral frequencies through SCF computation; and c7) generating a SCF feature matrix by mapping the SCF values across dimensions of the cycle frequencies and the spectral frequencies, thereby characterizing cyclostationary properties of the digital input signal.

16. The method according to claim 15, the first ADFT being configured to transform each windowed segment from the time domain to the frequency domain.

17. The method according to claim 15, the second ADFT being configured to operate over correlation delays corresponding to the conjugate multiplied segments, thereby extracting cyclostationary features.

18. The method according to claim 15, the SCF values being generated by associating accumulated spectral correlation values with corresponding cycle frequencies and spectral frequencies.

19. The method according to claim 11, step c) being performed in real time on streaming input data using high-bandwidth hardware designed to reduce power consumption and step c) being executed on an edge computing device comprising an embedded processor, a software-defined radio (SDR), and a mobile radio terminal.

20. A system for generating low-complexity radio digital signal processing (DSP) and artificial intelligence (AI)-processing via Spectrum Correlation Function (SCF) using Approximate Discrete Fourier Transform (ADFT) with linear computational complexity O(N) for modulation and signal classification, the system comprising:

a phased antenna array;

a receiver array in operable communication with the phased antenna array;

a processor; and a machine-readable medium in operable communication with the processor and having instructions stored thereon that, when executed by the processor, perform the following steps:

a) receiving a digital input signal comprising in-phase (I) and quadrature (Q) components from the receiver array;

b) normalizing the I and Q components, thereby generating a normalized signal with zero mean and unit power;

c) computing SCF by applying a sparse, factorized ADFT to cyclic autocorrelation of the normalized signal, thereby generating a SCF feature matrix;

d) inputting the SCF feature matrix for training a neural network model; and e) outputting a modulation classification label corresponding to type of modulation present in the digital input signal, the sparse, factorized ADFT being based on sparse factorized transformation configured to reduce computational complexity to approximately O(N), the sparse, factorized ADFT comprising a sequence of sparse matrix operations, including diagonal and permutation matrices, step b) comprising the sub-steps of:

b1) removing a zero-frequency component by subtracting a mean of each of the I and Q components over a defined window;

b2) calculating a signal magnitude for each complex sample formed by the I and Q components at a single point in time; and b3) scaling each complex sample to generate the normalized signal with zero mean and unit power, step c) comprising the sub-steps of:

c1) segmenting the digital input signal into a plurality of time-domain analysis windows, each time-domain analysis window being overlapping or non-overlapping;

c2) applying a Hamming window function to each time-domain analysis window to mitigate spectral leakage, thereby generating windowed segments;

c3) applying a first ADFT to each windowed segment to obtain frequency-domain segments;

c4) performing frequency down-conversion by mixing each frequency-domain segment with a complex local oscillator signal to shift the frequency-domain segments to baseband, thereby generating pairs of baseband-shifted frequency-domain segments;

c5) performing conjugate multiplication between the pairs of baseband-shifted frequency-domain segments to extract spectral correlation values, thereby generating conjugate multiplied segments;

c6) applying a second ADFT to the spectral correlation values, thereby generating SCF values over a range of cycle frequencies and spectral frequencies through SCF computation; and c7) generating a SCF feature matrix by mapping the SCF values across dimensions of the cycle frequencies and the spectral frequencies, thereby characterizing cyclostationary properties of the digital input signal, the first ADFT being configured to transform each windowed segment from the time domain to the frequency domain, the second ADFT being configured to operate over correlation delays corresponding to the conjugate multiplied segments, thereby extracting cyclostationary features, the SCF values being generated by associating accumulated spectral correlation values with corresponding cycle frequencies and spectral frequencies, step c) being performed in real time on streaming input data using high-bandwidth hardware designed to reduce power consumption, and step c) being executed on an edge computing device comprising an embedded processor, a software-defined radio (SDR), and a mobile radio terminal.

* * * * *